US008903838B2

(12) United States Patent
Hunter et al.

(10) Patent No.: US 8,903,838 B2
(45) Date of Patent: Dec. 2, 2014

(54) SYSTEM AND METHOD FOR PREVENTING DUPLICATE FILE UPLOADS IN A SYNCHRONIZED CONTENT MANAGEMENT SYSTEM

(71) Applicant: Dropbox, Inc., San Francisco, CA (US)

(72) Inventors: Rian Hunter, San Francisco, CA (US);
David Euresti, San Francisco, CA (US);
Brian Smith, San Francisco, CA (US);
Alicia Chen, San Francisco, CA (US);
Alex Sydell, San Francisco, CA (US);
Aston Motes, San Francisco, CA (US);
Jie Tang, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 54 days.

(21) Appl. No.: 13/723,820

(22) Filed: Dec. 21, 2012

(65) Prior Publication Data
US 2014/0122447 A1 May 1, 2014

Related U.S. Application Data

(60) Provisional application No. 61/719,729, filed on Oct. 29, 2012.

(51) Int. Cl.
G06F 17/30 (2006.01)
(52) U.S. Cl.
CPC ...... *G06F 17/3015* (2013.01); *G06F 17/30097* (2013.01); *G06F 17/30174* (2013.01)
USPC .......... 707/758; 707/661; 707/674; 707/658; 707/791; 707/828

(58) Field of Classification Search
CPC .................................. G06F 17/30174
USPC .......... 707/661, 674, 736, 758, 791, 822, 828
See application file for complete search history.

(56) References Cited

U.S. PATENT DOCUMENTS

| 5,845,265 | A | 12/1998 | Woolston |
| 6,266,651 | B1 | 7/2001 | Woolston |
| 7,315,978 | B2 * | 1/2008 | Giles .......................... 715/221 |
| 7,478,113 | B1 | 1/2009 | De Spiegeleer et al. |
| 7,991,790 | B2 | 8/2011 | Barker et al. |
| 2006/0059116 | A1 | 3/2006 | Levi et al. |
| 2006/0124730 | A1 | 6/2006 | Maloney |
| 2007/0174341 | A1 | 7/2007 | Saripalli et al. |

(Continued)

OTHER PUBLICATIONS

U.S. Office Action dated Apr. 9, 2014, issued in related US. Appl. No. 13/724,643.

*Primary Examiner* — Sana Al Hashemi
(74) *Attorney, Agent, or Firm* — Novak Druce Connolly Bove + Quigg$^{LLP}$

(57) ABSTRACT

A method and system for preventing duplicate file uploads in a remote content management system is described. The user device receives a hash value list associated with the files stored in the remote content management system. The user device calculates a hash value associated with new files to be uploaded. The system then compares the hash value(s) associated with the new file(s) to be uploaded with the hash value list received from the remote file storage system. If the hash values of any of the new files to be uploaded match a hash value on the hash value list, then the system prevents the new files from being uploaded to the remote file storage system.

22 Claims, 3 Drawing Sheets

(56) References Cited

U.S. PATENT DOCUMENTS

| | | |
|---|---|---|
| 2009/0132543 A1 | 5/2009 | Chatley et al. |
| 2009/0141932 A1 | 6/2009 | Jones et al. |
| 2009/0319570 A1 | 12/2009 | Subramanian |
| 2010/0100587 A1* | 4/2010 | Teglovic et al. ............. 709/203 |
| 2010/0332401 A1* | 12/2010 | Prahlad et al. ................. 705/80 |
| 2011/0106755 A1 | 5/2011 | Hao et al. |
| 2011/0218967 A1 | 9/2011 | Sliger et al. |
| 2011/0307884 A1* | 12/2011 | Wabe et al. ................... 717/178 |
| 2012/0143917 A1 | 6/2012 | Prabaker et al. |
| 2012/0311081 A1 | 12/2012 | Robbin et al. |
| 2013/0268499 A1* | 10/2013 | Kirihata et al. ............... 707/692 |

\* cited by examiner

SYSTEM AND METHOD FOR PREVENTING DUPLICATE FILE UPLOADS IN A SYNCHRONIZED CONTENT MANAGEMENT SYSTEM

CLAIM OF PRIORITY

This claims the benefit of priority under 35 U.S.C. §119(e) to U.S. Provisional Patent Application No. 61/719,729, filed Oct. 29, 2012.

BACKGROUND

Today, a large percentage of electronic content management, storage, and related services are remote, or "cloud" based. That is, many services allow a user to upload, store, and share files through remote servers. The trend is to centralize files (e.g., photos) and allow a user to access these centrally stored files through multiple devices and/or locations, utilizing a single account. Centralized storage is especially useful for two reasons. First, mobile devices, such as smart phones, tablets, and cameras, may have limited storage space. Second, users may desire to access all of their files (e.g., photos or videos) at any time on any device; however, it is impractical to store copies of all photo or video files on all devices. Cross-platform content synchronization and storage helps to eliminate or reduce these problems by allowing a user to store large files remotely and then access them through multiple devices.

To make uploading to a cloud-based content management system more efficient for the user, some services enable cross-platform content synchronization and sharing (e.g., Dropbox™), which enables users to conveniently upload, store, and view files on any device associated with the account. These services allow a user to setup their device to allow automatic uploads of files to the content management system. When the user has multiple devices that are configured to allow for automatic uploads, the content management system runs the risk of uploading the same file twice. In a particular example, a user may take a photo on their smart phone, which is configured to automatically upload the photo to a cloud-based content management system. Later, the user may save the same photo to their desktop computer when they dock their smart phone with their computer. The computer may be set up to upload image files from the smart phone and may also be configured to act as a client device with the content management system. In this instance, the photo may be automatically uploaded twice—once directly from the smart phone and again from the desktop computer. Detecting duplicate uploads may further be frustrated since the first uploaded image file may have been renamed when it was uploaded to the computer from the smart phone. As illustrated from this example, uploading a duplicate photo is inefficient, wastes bandwidth (especially in the case of mobile devices), creates electronic clutter, and takes up unnecessary space on the content management system's servers. The present disclosure recognizes and addresses the foregoing considerations, and others, of prior art system and methods.

SUMMARY

A computer-implemented method, according to various embodiments, that may prevent the upload of duplicate files to a content management system. In various embodiments, a method may include the step of maintaining a hash value list. Each of the hash values on the list may correspond to a respective file that has been received by at least one of the servers for storage within a user's account. Various embodiments may also enable an upload of a file from a client device to at least one server for storage within the account. Additionally, some embodiments may include in response to receiving the file, calculating a hash value for the file and determining whether the calculated hash value is on the hash value list maintained by at least one server. Also, various embodiments may include, in response to determining that the calculated hash value is not included in the hash value list: (a) creating an updated hash value list by adding the calculated hash value to the hash value list, and (b) storing the uploaded file in the account.

In various embodiments, in response to determining that the calculated hash value is included in the hash value list, the content management system may delete the uploaded file. In these embodiments, in response to determining that the calculated hash value is included in the hash value list, the content management system may transmit the hash value list to the client device.

In various embodiments, the uploaded file has a size associated with the file, and the data that forms the file that is expressed in bytes. In some embodiments, the content management server receives a hash value from the client device for the uploaded file. In some of these embodiments, the received hash value is calculated based on at least one attribute of the file and at least a portion of the bytes that form the file. In various embodiments, at least one attribute is the size of the file, and the at least a portion of the bytes is the first 8 kilobytes of the file. In some of these embodiments, the client device may be a mobile device.

In various embodiments, the hash value calculated by the content management system is based on all of the data that forms the file. In some embodiments, at least partially based on determining that the calculated hash value is not included in the hash value list, the content management system may update the hash value list by adding the received hash value to the list. In some of these embodiments, the content management system may transmit the updated hash value list to the client device.

A computer system, according to various embodiments, may include at least one processor, memory operatively coupled to the at least one processor, and a network connection operatively coupled to the at least one processor. In various embodiments, at least one processor may be configured to: (1) maintain a hash value list for at least one file that is associated with an account and stored in the memory; (2) receive at least one file from the at least one client device; (3) calculate a hash value for the received at least one file; and (4) store the at least one file if the calculated hash value for the received at least one file is not on the list of hash value. In various embodiments, the file may be a photo file.

BRIEF DESCRIPTION OF THE DRAWINGS

Various embodiments of a computer system for uploading and preventing duplicate copies of files from being uploaded from multiple devices are described below. In the course of this description, references will be made to the accompanying drawings, which are not necessarily drawn to scale, and wherein.

DETAILED DESCRIPTION

Figure 1:
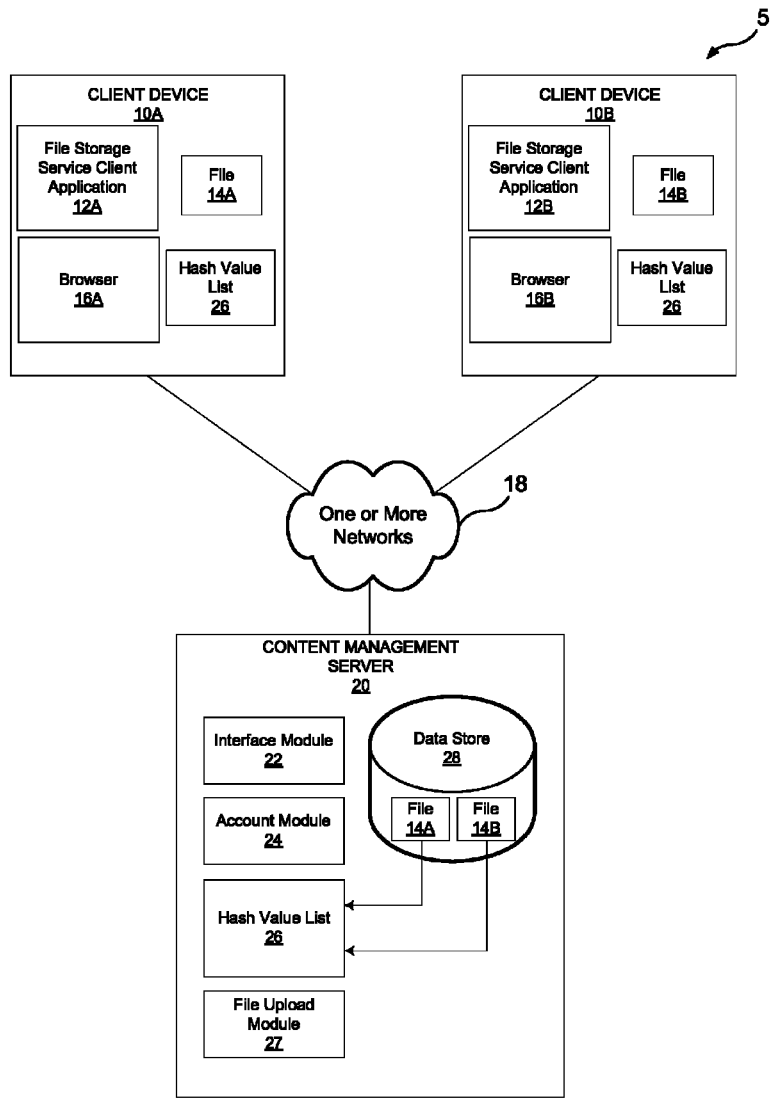
FIG. 1 shows a block diagram of a content management system in accordance with an embodiment of the present system.

Various embodiments will now be described. It should be understood that the present systems and methods may be embodied in many different forms and should not be construed as limited to the embodiments set forth herein. Like numbers refer to like elements throughout.

System Overview

A computer system according to various embodiments may include a content management system that receives automatically uploaded files from a client device (e.g., a desktop computer, a laptop computer, a handheld device, or other computing device) to a cloud-based storage location. In order to prevent duplicate files from being uploaded to the server (the content management system may calculate a hash value based on information related to the file. This information may include, for example, the size of the file, the file name, the content of the file, and/or any other suitable information.

In various embodiments, the system may compile a list that includes a hash value for each file that has been previously uploaded to the user's account. The system may use this list to prevent duplicate uploads from a mobile client device or desktop computer. On a mobile device, a hash value based on a small amount of information for a particular photo may be calculated and compared to the list. On a desktop computer, a hash value based on a more complete set of information for a particular photo may be calculated and compared to the list.

In either case, if the new file's hash value matches a hash value on the compiled list, then the system may automatically prevent an upload of the file to the server since the file is considered a duplicate of a previously uploaded file. If the new file's hash value does not match any of the values on the compiled list, then the client device may upload the new file to the server. In some cases, the server may use more sophisticated similar hash value comparison techniques to further verify that the uploaded file is not a duplicate of another file on the system.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of content management system 5 according to a particular embodiment. Content management system 5 includes one or more client devices 10A or 10B (collectively "10"), such as a desktop computer, a mobile device (e.g., a laptop computer, a smart phone, a mobile computing device, or a handheld device) or another device capable of transferring files over network 18, that are in communication with content management server 20. Network 18, between content management server 20 and client devices 10, may be, for example, implemented via one or more wired or wireless networks such as LANs, WANs, a cellular network, a Wi-Fi network, or via the Internet. For purposes of ease of explanation and clarity, no specific cellular network is shown in FIG. 1 as a network for a mobile device. However, a cellular tower may be coupled to a cellular network provider, which may be operatively coupled to network 18.

In some embodiments, content management server 20 includes data storage 28, interface module 22, account module 24, and file upload module 27. Content management server 20 is connected to one or more client devices 10 via network 18. In various embodiments, content management server 20 may include one or more servers that are located in close physical proximity, or some servers may be locally together and others remote. In either case, all devices, wherever located, function as a system.

Interface module 22 facilitates file access and file storage between content management server 20 and client devices 10. Interface module 22 receives files from and sends files to client devices 10 consistent with the user's preferences for sharing files. Interface module 22 may act as the counterpart to a client-side file storage service client application 12A, 12B user interface that allows a user to manipulate files directly stored on content management server 20. In some embodiments, software operating on client devices 10 integrates network-stored files with the client's local file system to enable a user to manipulate network-stored files through the same user interface (UI) used to manipulate files on the local file system, e.g., via a file explorer, file finder, or browser application. As an alternative or supplement to the client-side file explorer interface, user interface module 22 may provide a web interface for client devices 10 to access (e.g. via browser 16) and allow a user to manipulate files stored on content management server 20. In this way, the user can directly manipulate files stored on content management server 20.

In various embodiments, data store 28 stores files such as those uploaded using client devices 10. It should be understood that, in various embodiments, data store 28 may include of multiple data stores—some local to, and some remote from, content management server 20. In the embodiment illustrated in FIG. 1, a first user associated with client 10A has certain files 14A associated with their account, and a second user associated with client 10B has certain files 14B associated with their account. Copies of these files are centrally stored in data store 28. Copies of each respective user's files may also be locally stored on multiple client devices 10 associated with the user's account. In various embodiments, each client device 10A and 10B may be used by the same user. In these embodiments, each client device 10 may have files stored on content management server 20 that are synced across the client devices. In other embodiments, the client devices may be used by different users.

Data store 28 maintains, for each user in a file journal, information identifying the user, information describing the user's file directory, etc. In some embodiments, the file journal is maintained on content management server 20. This file journal may be updated periodically using information obtained directly from content management server 20 and/or from information obtained from one or more client devices 10 linked to the user's account. In this way, the server-stored file journal (hereinafter the "server-side file journal") is updated when a file is changed either on the server or on one of the client devices associated with the user's account. When a file is changed, content management server 20 propagates the change to each client device associated with the user's account. For example, if a user makes a change to a particular file on a first client device, the change may be reflected in the server-side file journal. The system then uses the server-side file journal to propagate the change to all client devices associated with the user's account. Such techniques may be implemented, for example, within the context of a synchronized file system such as the Dropbox Service of Dropbox, Inc. of San Francisco, Calif.

Figure 2:
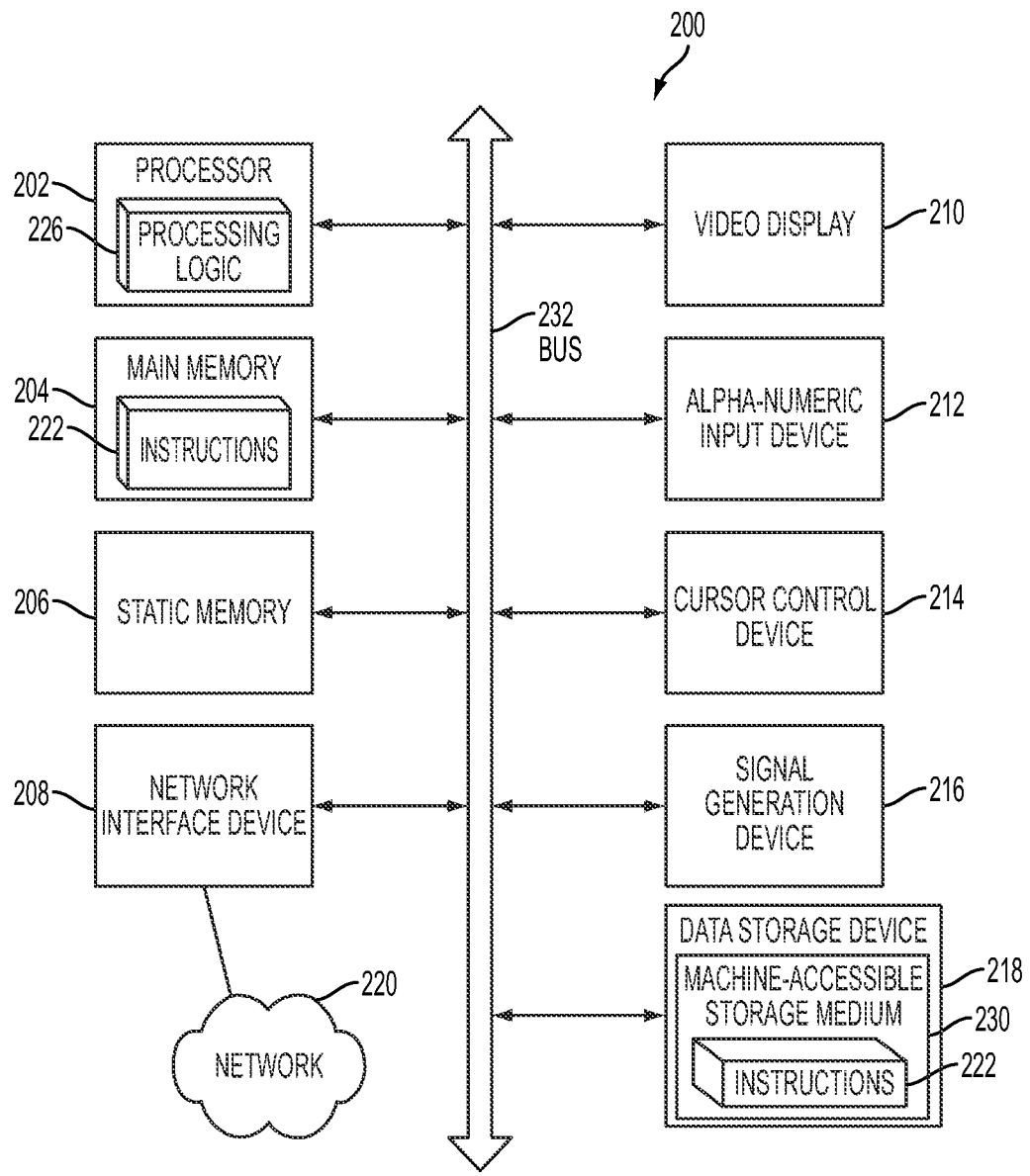
FIG. 2 shows a block diagram of a computer that may be used, for example, as a client device or server computer within the context of the content management system of FIG. 1.

FIG. 2 illustrates a diagrammatic representation of computer 200 that can be used within content management system 5, for example, as client computer, or as content management server 20 (FIG. 1). For purposes of this disclosure, reference to a server or processor, shall be interpreted to include either a single server, a single processor, or multiple servers, or multiple processors.

In particular embodiments, computer 200 may be connected (e.g., networked) to other computers by a LAN, WAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alphanumeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., file upload module 27, which is configured to carry out the steps illustrated in FIG. 3) embodying any one or more of the methodologies or functions described herein. File upload module 27 may also reside, completely or at least partially, within main memory 204 and/or within processing device 202 during execution thereof by computer 200, main memory 204, and processing device 202 also constituting computer-accessible storage media. Instructions 222 (e.g., file upload module 27) may further be transmitted or received over network 220 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media.

Exemplary System Operation

Figure 3:
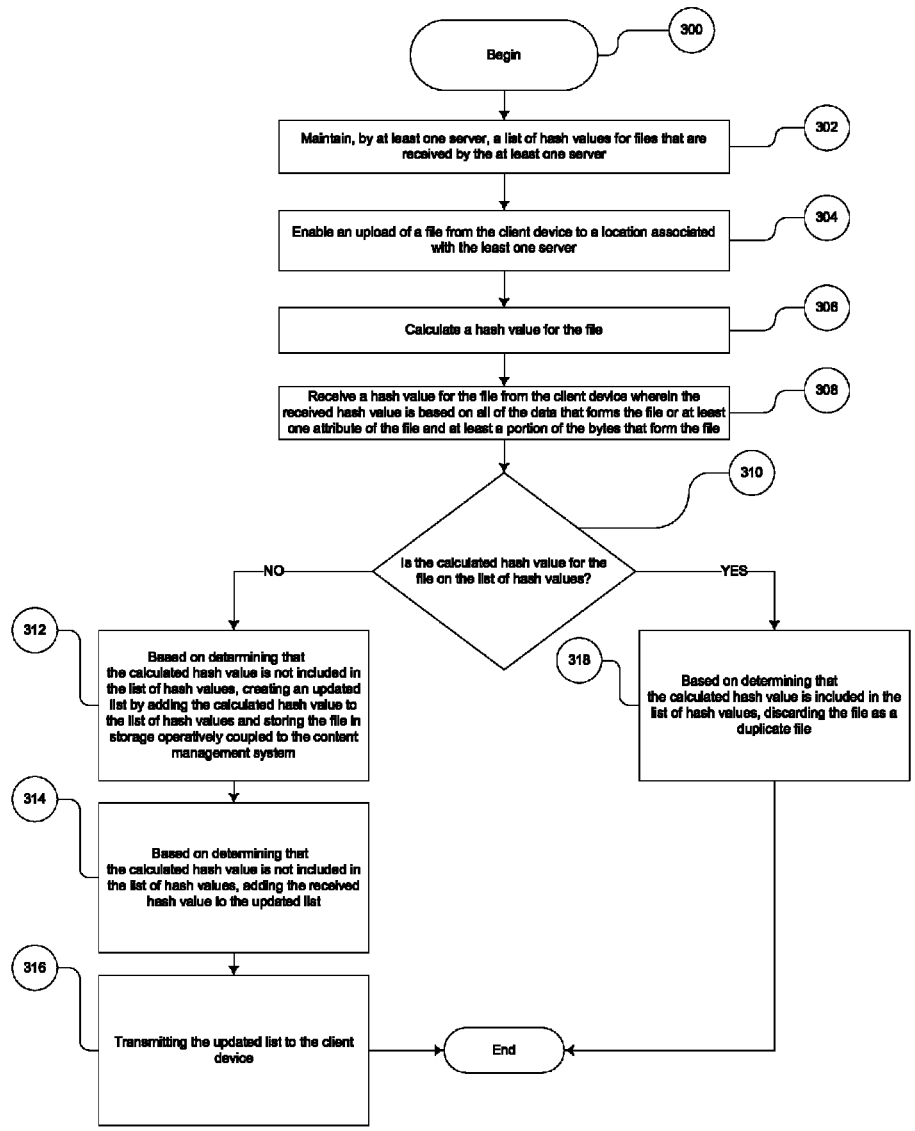
FIG. 3 shows a flow diagram that generally illustrates various steps executed by a client device in accordance with various embodiments of the system of FIG. 1.

FIG. 3 shows exemplary file upload module 27 that may prevent duplicate files from being uploaded from client device to content management system 20, in accordance with various embodiments. Beginning at step 302, content management system 20 may maintain hash value list 26 for files (e.g., photos) (for example, 14A or 14B in FIG. 1), each hash value corresponding to a respective file that has been received by the at least one server for storage within the account. Typically, the file or files are associated with an account for a single user and linked to one or more client devices 10, although other embodiments may be envisioned. For example, the files could be associated with accounts for multiple users with shared access to the files. As a result, hash value list 26 may include hash values for files uploaded from one or more of the client devices. In various embodiments, hash value list 26 may include several different types of hash values for each file uploaded from the client devices linked to the account.

There are many different ways to create a hash value or some similar file identification that is unique to the file. In one particular example, the hash value may be produced by an algorithm, which can be at least partially based on one or more attributes of a photo and/or a portion of the photo file. Thus, for purposes of this disclosure, a "mobile hash value" is a hash value that is calculated based on at least one attribute of a photo (e.g., the size or name of the photo file) and at least a portion of the data that forms the file (e.g., a portion of the bytes that make up the photo file). For example, in various embodiments, a mobile hash value is calculated using a hash algorithm based on a size of the photo file and the first 8 kilobytes of the photo file. In other embodiments, the mobile hash value may be calculated based on the name of the photo file and at least a portion of the data that forms the file. Additionally, the algorithm can be a message digest checksum algorithm, such as the MD family of hash functions (e.g., MD5) or any other suitable hash value algorithm that produces a unique identifier for the file. Furthermore, for purposes of this disclosure, a "standard hash value" is a hash value that is calculated based on all of the bytes that form the file.

At step 304, content management system 20 may receive a request to upload a file from the client device for storage within the account. In various embodiments, the request and the upload of the file may occur over network 18. Additionally, in some embodiments, the file upload request may be initiated by the client device. In other embodiments, the file upload request may be initiated by the server.

In various embodiments, the request can include the file. At least partially in response to receiving the file, at step 306, the server may calculate a hash value for the file. As discussed above, the calculated hash value may be calculated in several different ways. In various embodiments, the content management system may calculate the hash value based on all the data of the file (e.g., a standard hash value). In other embodiments the server may calculate the hash value based on properties of the file, attributes of the file, or on a partial amount of the data of the file (e.g., a mobile hash value). Alternatively, the server may calculate the hash value based on a combination of attributes and data of the file.

In various embodiments, at step 308, the server may receive a hash value for the file from the client device. The received hash value may be calculated by the client device using any of the methods discussed above, and the received hash value may be a mobile or standard hash value. In certain embodiments, the received hash value may be calculated based on the size of the file and the first 8 kilobytes of data of the file.

At step 310, the content management system may determine whether the hash value calculated by the at least one server (at step 306) is on hash value list 26. If the calculated hash value is not on the hash value list, then, at step 312, content management system 20 may update the hash value list by adding the calculated hash value to the hash value list. The content management system may also store the file in the account on the content management system. In certain embodiments, the storage may be cloud-based.

If, on the other hand the content management system determines that the calculated hash value is on the hash value list, at step 314, the server may add the received hash value to hash value list 26. In some embodiments, the calculated hash value and the received hash value may be added at the same time. In other embodiments, the received hash value may be added to the hash value list after the calculated hash value is added.

In various embodiments, the calculated hash value and the received hash value may be calculated the same way (i.e., both are standard hash values or both are mobile hash values). Therefore, if the calculated hash value and the received hash value match, one of the two hash values may be discarded. In other embodiments, the calculated hash value may be a standard hash value and the received hash value may be a mobile hash value.

At step 316, the server may transmit the updated list to one or more client devices that are associated with the account on the content management system. In some embodiments, the transmission of the updated list may be initiated by request from the client device. In other embodiments, the server may send the updated list to the client device every time it is updated.

At step 318, at least partially based on determining that the calculated hash value is included in hash value list 26, content management system 20 may identify the uploaded file as a duplicate file. The content management system, in various embodiments, may prevent the uploaded of the duplicate file. Preventing upload of a duplicate file may be advantageous because it saves space on the content management system, eliminates clutter, and reduces other problems associated with having multiple duplicate files such as version control. Additionally, the content management system 20 can respond with a status to re-download the hash value list.

In various embodiments, if a file is uploaded by a client device based on the received hash value, the content management system may transmit the hash value list to at least one of the client devices associated with the account. In this way, the content management system may ensure that all of the client devices associated with the account upload file to the content management system based on the most up to date hash value list.

In various embodiments, the content management system may be a synchronized content management system. One example of a suitable synchronized content management system is the Dropbox™ content management services provided by Dropbox, Inc. of San Francisco, Calif.

Conclusion

Having the benefit of the teachings presented in the foregoing descriptions and associated drawings, one of skill in the art will recognize many modifications and other embodiments of the invention. In light of the above, it is to be understood that the invention is not to be limited to the specific embodiments disclosed and that modifications and other embodiments are intended to be included within the scope of the appended claims. For example, although many of the examples described above in the context of preventing the uploading and/or storage of duplicate photo files, the same or similar techniques may be used to prevent the uploading and/or storage of duplicate files of other types (e.g., document files, music files, video files, and .pdf files). Although specific terms are employed herein, they are used in a generic and descriptive sense only and not for the purposes of limitation.

What is claimed is:

1. A computer-implemented method of preventing duplicate files in an account on a content management system that is associated with a particular user, comprising:
   maintaining, by at least one server, a hash value list, each of the hash values on the list corresponding to a respective file that has been received by the at least one server for storage within the account;
   enabling an upload of a file from a client device to the at least one server for storage within the account;
   at least partially in response to receiving the file, calculating a hash value for the file;
   determining whether the calculated hash value for the file is on the hash value list maintained by the at least one server;
   at least partially in response to determining that the calculated hash value is not included in the hash value list:
   creating an updated hash value list by adding the calculated hash value to the hash value list, and
   storing the uploaded file in the account.

2. The computer-implemented method of claim 1, at least partially in response to determining that the calculated hash value is included in the hash value list, transmitting the hash value list to the client device.

3. The computer-implemented method of claim 1, further comprising receiving a hash value from the client device for the uploaded file.

4. The computer-implemented method of claim 3, wherein the file has data that forms the file that is expressed in bytes, and wherein the received hash value is calculated based on at least one attribute of the file and at least a portion of the bytes that form the file.

5. The computer-implemented method of claim 4, wherein, the at least one attribute is a size of the file; and
   the at least a portion of the bytes is a first 8 kilobytes of the file.

6. The computer-implemented method of claim 5, wherein the client device is a mobile device.

7. The computer-implemented method of claim 2, wherein the calculated hash value is based on all of the data that forms the file.

8. The computer-implemented method of claim 2, further comprising based on determining that the calculated hash value is not included in the hash value list, updating the hash value list, maintained by the at least one server, by adding the received hash value to the list.

9. The computer-implemented method of claim 8, further comprising transmitting, by the at least one server, the updated hash value list to the client device.

10. The computer-implemented method of claim 1, wherein the file is a photo.

11. The computer-implemented method of claim 1, wherein the content management system is a synched file sharing system.

12. A system for preventing duplicate files associated with an account on a content management system that is linked to at least one client device, comprising:
    at least one processor; and
    memory operatively coupled to the at least one processor;
    wherein the at least one processor is configured to:
      maintain a hash value list for at least one file that is:
      associated with the account; and
      stored in the memory of the content management system;
      receive at least one file from the at least one client device;
      calculate a hash value for the received at least one file; and
      store the at least one file if the calculated hash value for the received at least one file is not on the list of hash value.

13. The system of claim 12, wherein the at least one client device is a mobile device.

14. The system of claim 12, wherein the at least one processor is further configured to receive a hash value from the at least one client device, wherein the received hash value is calculated based on at least one attribute of the received at least one file and at least a portion of bytes that form the received at least one file.

15. The system of claim 12, wherein the calculated hash value is based on all of the bytes that form the received at least one file.

16. A system for preventing duplicate file uploads to an account on a content management system, wherein the account is linked to at least one client device, comprising:
    means for maintaining a hash value list for a plurality of stored files stored in memory that is operatively coupled to the content management system, wherein the plurality of stored files are associated with the account;
    a means to enable a transfer of a file from the at least one client device;
    a means for calculating a hash value for the transferred file;
    a means for determining whether the calculated hash value is included on the hash value list; and
    a means of storing the transferred file in the memory.

17. The system of claim 16, wherein:
    the transferred file is comprised of bytes; and
    the calculated hash value is based on all of the bytes that comprise the transferred file.

18. The system of claim 16, further comprising a means of receiving a hash value from the at least one client device.

19. The system of claim 18, further comprising a means of updating the hash value list to include the calculated hash value and the received hash value if the calculated hash value is not included on the hash value list maintained on the content management system.

20. The system of claim 19, further comprising a means of transmitting the updated hash value list to a plurality of client devices associated with the account.

21. The system of claim 16, wherein the content management system is a means for synchronizing files across multiple client devices linked to a user's account on the content management system.

22. The system of claim 16, wherein the hash value list includes a hash value corresponding to a first file received from a first client device configured to run a first operating system and a second hash value corresponding to a second file received from a second client device configured to run a second operating system.

* * * * *